(12) United States Patent
Doevenspeck et al.

(10) Patent No.: US 12,462,880 B2
(45) Date of Patent: Nov. 4, 2025

(54) MATRIX-VECTOR MULTIPLICATIONS BASED ON CHARGE-SUMMING MEMORY CELL STRINGS (71) Applicant: IMEC VZW, Leuven (BE)

(72) Inventors: Jonas Doevenspeck, Herent (BE); Maarten Rosmeulen, Ghent (BE); Stefan Cosemans, Leuven (BE)

(73) Assignee: Imec vzw, Leuven (BE)

( * ) Notice: Subject to any disclaimer, the term of this patent is extended or adjusted under 35 U.S.C. 154(b) by 201 days.

(21) Appl. No.: 18/392,161

(22) Filed: Dec. 21, 2023

(65) Prior Publication Data

US 2024/0212763 A1 Jun. 27, 2024

(30) Foreign Application Priority Data

Dec. 22, 2022 (EP) .................................. 22215794

(51) Int. Cl.
*G11C 16/26* (2006.01)
*G11C 16/04* (2006.01)
*G11C 16/08* (2006.01)
*G11C 16/10* (2006.01)

(52) U.S. Cl.
CPC .......... *G11C 16/26* (2013.01); *G11C 16/0433* (2013.01); *G11C 16/08* (2013.01); *G11C 16/102* (2013.01)

(58) Field of Classification Search
CPC ..... G11C 16/26; G11C 16/0433; G11C 16/08; G11C 16/102; G11C 11/54; G11C 7/1006; G06F 7/5443; G06N 3/063; G06N 3/065

See application file for complete search history.

(56) References Cited

U.S. PATENT DOCUMENTS

2020/0211649 A1* 7/2020 Park .................... G11C 29/42
2020/0311523 A1* 10/2020 Hoang ................ G06F 9/30029

OTHER PUBLICATIONS

M. Kim et al., "A 3D NAND Flash Ready 8-Bit Convolutional Neural Network Core Demonstrated in a Standard Logic Process," 2019 IEEE International Electron Devices Meeting (IEDM), San Francisco, CA, USA, 2019, pp. 38.3.1-38.3.4 (Year: 2019).*

(Continued)

*Primary Examiner* — Alexander Sofocleous
*Assistant Examiner* — James S Wells
(74) *Attorney, Agent, or Firm* — McDonnell Boehnen Hulbert & Berghoff LLP (57) ABSTRACT

Example embodiments relate to matrix-vector multiplications based on charge-summing memory cell strings. An example in-memory compute device for performing analog multiply-and-accumulate operations on a set of data inputs and a set of weight inputs includes a string of serially connected memory cells formed over a semiconductor channel structure, a source junction controllably connectible to one end of the string of memory cells via a string select switch, a readout circuit including a sense node controllably connectible to one end of the string of memory cells via a charge transfer switch, and control circuitry. The control circuitry is configured to apply pass mode signals, data input signals, and stop signals sequentially according to each memory cell's position along a string. The control circuitry is also configured to enable the string select switch and the charge transfer switch.

20 Claims, 5 Drawing Sheets

(56) References Cited

OTHER PUBLICATIONS

Extended European Search Report and Search Opinion, Application No. EP 22215794.3, mailed Jun. 26, 2023, 5 pages.

Cosemans, Stefan, Bram Verhoef, Jonas Doevenspeck, I. A. Papistas, Francky Catthoor, Peter Debacker, Arindam Mallik, and Diederik Verkest. "Towards 10000TOPS/W DNN inference with analog in-memory computing—a circuit blueprint, device options and requirements." In 2019 IEEE International Electron Devices Meeting (IEDM), pp. 22.2.1-22.2.4 IEEE, 2019.

* cited by examiner

MATRIX-VECTOR MULTIPLICATIONS BASED ON CHARGE-SUMMING MEMORY CELL STRINGS

CROSS-REFERENCE TO RELATED APPLICATIONS

The present application is a non-provisional patent application claiming priority to European Patent Application No. EP 22215794.3, filed on Dec. 22, 2022, the contents of which are hereby incorporated by reference.

FIELD OF THE DISCLOSURE

The present disclosure relates to the field of in-memory compute devices and methods. It relates to ways of operating NAND-string based memory devices as mixed-signal multiply-and-accumulate element and matrix-vector multipliers.

BACKGROUND

The recent surge in machine learning applications and the steady development of powerful deep neural networks, hardware accelerators and energy-efficient near-memory or in-memory compute devices have attracted a lot of attention for the potential to overcome the energy and delay bottlenecks that can afflict traditional Von Neumann computer architectures. Indeed, state-of-the-art deep neural networks often require storage of several hundreds of megabytes worth of network parameters and need several gigabytes of working memory for floating-point precision multiply-and-accumulate operations (MAC) during network inference passes. Under these circumstances, frequent data accesses to off-chip memory become very energy-inefficient. It is thus desirable to perform an inference pass related to the computations at the location where the network parameters are stored, thereby reducing as much as possible the amount of data transfers.

S. Cosemans et al., "Towards 10000TOPS/W DNN Inference with Analog in-Memory Computing—A Circuit Blueprint, Device Options and Requirements," 2019 IEEE International Electron Devices Meeting (IEDM), 2019, pp. 22.2.1-22.2.4, presents a matrix-vector multiplier for neural network inference which is based on analog in-memory computing. A compute array of flash transistors configured as current source-like elements receives pulse-width encoded activation inputs. Output currents generated by the array elements discharge summation lines.

The proposed matrix-vector multiplier, however, lacks the compactness known from dense NAND flash memory arrays.

SUMMARY

Embodiments of the present disclosure provide dense and energy-efficient in-memory compute devices.

Methods and devices according to the present disclosure provide these features.

In a first embodiment, the present disclosure relates to an in-memory compute device that is suitable for performing analog multiply-and-accumulate operations on a set of data inputs and a corresponding set of weight inputs. The compute device comprises a string of serially connected memory cells which are formed over a semiconductor channel structure, a source junction controllably connectible to one end of the string of memory cells via a string select switch, a readout circuit and control circuitry. Each memory cell comprises a programmable threshold transistor adapted for permanently storing a threshold voltage representing a respective weight of the set of weight inputs. The readout circuit includes a sense node that is controllably connectible to one end of the string of memory cells via a charge transfer switch. Additionally, the readout circuit is configured to buffer transferred charge packets from the string of memory cells as a charge sum signal present on the sense node and convert the charge sum signal into an output voltage. The control circuitry is configured for: (i) applying a pass mode signal to control gate terminals of the respective memory cells of the string to cause the memory cells of the string to be switched on, regardless of the programmed threshold voltages; (ii) applying data input signals representative of the set of data inputs to the control gate terminals of the respective memory cells of the string, wherein applied data input signals representing binary zeroes cause memory cells of the string to be switched off; (iii) applying stop signals to the control gate terminals of the respective memory cells of the string to cause the remaining memory cells of the string to be switched off; (iv) enabling the string select switch to connect the source junction to the string of memory cells while applying the pass mode signal and the data input signals; and (v) enabling the charge transfer switch to connect the sense node to the string of memory cells while applying the stop signals. The data input signals and the stop signals are applied sequentially according to each memory cell's position along the string.

According to some embodiments, the sense node is identical to the source junction and the string select switch corresponds to the charge transfer switch. In this case, the sense node acts both as a supply of charge carrier to be injected into the channel structure and as a collector for transferred charge packets from the channel structure, though the functionality depends on the different phases of device operation. Since no separate source-sided junction has to be formed, such embodiments may be more straightforward to manufacture.

According to some embodiments, the readout circuit is further configured to sample the output voltage after applying the stop signals.

According to some embodiments, a plurality of strings of serially connected memory cells of the first aspect form columns of an arrayed memory structure. The memory cells of the plurality of strings are disposed at cross-points of the columns and rows of word lines. The strings of memory cells may be oriented in a vertical direction with respect to a major horizontal surface of a substrate of the in-memory compute device, thus forming a 3D structure. The word lines may be organized into word line sets and driven according to a multi-level data input. The control gate terminals of memory cells connected to different word lines of each word line set may have different associated gate lengths.

In another example embodiment, a method of performing analog multiply-and-accumulate operations in a memory device which comprises at least one string of serially connected memory cells formed over a semiconductor channel structure is disclosed, where a junction is operatively connected to one end of the string and a sense node operatively connected to one end of the string. Each memory cell comprises a programmable threshold transistor adapted for permanently storing a threshold voltage that represents a weight input to the memory cell. The method comprises the step of: (i) inducing a charge packet underneath each memory cell in the semiconductor channel structure, by switching on the programmable threshold transistors of the memory cells of the string, the junction supplying the charge for inducing the charge packets; (ii) transferring the charge packets induced by a first group of memory cells of the string to the junction, by switching off the corresponding programmable threshold transistors on the string; (iii) transferring the charge packets induced by a second group of memory cells of the string, complementary to the first group of memory cells of the string, onto the sense node, by switching off the remaining programmable threshold transistors on the string; (iv) buffering the transferred charge packets from the string of memory cells on the sense node, thus generating a charge sum signal, and converting the buffered charge signal into an output voltage. Transferring the charge packets to the at least one junction and transferring the charge packets onto the sense node comprises transferring the charge packets sequentially according to each memory cell's position along the string.

In some embodiments, the fabric underlying the mixed-signal matrix-vector multiplications can achieve close to maximum density and may allow for highly energy-efficient matrix-vector multiplications.

In some embodiments, the sum of product terms and partial sums of product terms can be computed at or close to the location where the coefficients (multipliers) for the product terms are stored.

In some embodiments, the weight matrices of large artificial neural networks can be stored in an on-chip design of the in-memory compute device, without resorting to external memory access.

In some embodiments, weight inputs to the memory cells of the in-memory compute device can rely on the existing mature multi-level weight technology, for instance used in NAND flash memories. Thus, in-memory compute operations for artificial neural networks such as MAC operations can be performed with higher precision than fully-binarized network models, which can result in improved prediction performances. Moreover, multi-level weight inputs allow in-memory compute operations to be performed in a more energy-efficient way than compute operations that rely on floating-point precision.

In some embodiments, the in-memory compute device supports a variety of different neural network architectures.

In some embodiments, contrary to conventional NAND flash memory devices, no output currents from the string of memory cells may need to be sensed. Instead, the charge packets may be progressively summed on the sense node as the transistors of corresponding memory cells in the string are turned off, which limits the time during which unintended tunneling currents can occur. Therefore, some embodiments are less prone to or do not significantly suffer from reliability issues related to read disturb effects and read disturb noise.

Some embodiments may relate to an in-memory compute device that comprises a string of serially connected memory cells which are formed over a semiconductor channel structure, a source junction controllably connectible to one end of the string of memory cells via a string select switch, a readout circuit and control circuitry. Each memory cell comprises a programmable threshold transistor adapted for permanently storing a threshold voltage representing a respective weight of the set of weight inputs. The readout circuit includes a sense node that is controllably connectible to one end of the string of memory cells via a charge transfer switch. Additionally, the readout circuit is configured to buffer transferred charge packets from the string of memory cells as a charge sum signal present on the sense node and convert the charge sum signal into an output voltage. The control circuitry is configured for: (i) applying a pass mode signal to control gate terminals of the respective memory cells of the string to cause the memory cells of the string to be switched on, regardless of the programmed threshold voltages; (ii) applying data input signals representative of the set of data inputs to the control gate terminals of the respective memory cells of the string, wherein applied data input signals representing binary zeroes cause memory cells of the string to be switched off; (iii) enabling the string select switch to connect the source junction to the string of memory cells while applying the pass mode signal; and (iv) enabling the charge transfer switch to connect the sense node to the string of memory cells while applying the data input signals. The data input signals are applied sequentially according to each memory cell's position along the string. Memory cells of the first group may be defined as those memory cells of the string of memory cells which receive data input signals that represent a digital "OFF", whereas memory cells of the second group are defined as those memory cells of the string of memory cells which receive data input signals that represent a digital "ON".

Some embodiments may relate to a method of performing analog multiply-and-accumulate operations in a memory device which comprises at least one string of serially connected memory cells formed over a semiconductor channel structure, a junction operatively connected to one end of the string and a sense node operatively connected to one end of the string. Each memory cell comprises a programmable threshold transistor adapted for permanently storing a threshold voltage that represents a weight input to the memory cell. The method comprises the step of: (i) inducing a charge packet underneath each memory cell in the semiconductor channel structure, by switching on the programmable threshold transistors of the memory cells of the string, the junction supplying the charge for inducing the charge packets; (ii) transferring the charge packets induced by a first group of memory cells of the string onto the sense node, by switching off the corresponding programmable threshold transistors on the string; (iii) buffering the transferred charge packets from the string of memory cells on the sense node, thus generating a charge sum signal, and converting the buffered charge signal into an output voltage. Transferring the charge packets onto the sense node comprises transferring the charge packets sequentially according to each memory cell's position along the string. The method may include the additional step of inverting data inputs to obtain a data input signal sequence and applying the so obtained data input signal sequence to the respective programmable threshold transistors on the string, whereby memory cells of the first group are switched off. Memory cells of the first group may be defined as those memory cells of the string of memory cells which receive inverted data input signals that represent a digital "OFF", corresponding to original data input signals that represent a digital "ON". Inverting data inputs may comprise replacing each data input bit by its complement. The control circuitry of the in-memory compute device can be configured to invert the data inputs.

Some embodiments may further comprise the step of programming the threshold voltages of the memory cells of the string, whereby a weight input is assigned to each memory cell selected for programming and the threshold voltage is programmed in accordance with the assigned weight input.

Aspects of the disclosure are set out in the accompanying independent and dependent claims. Features from the dependent claims may be combined with features of the independent claims and with features of other dependent claims as appropriate and not merely as explicitly set out in the claims.

The above and other aspects of the disclosure will be apparent from and elucidated with reference to the embodiment(s) described hereinafter.

BRIEF DESCRIPTION OF THE DRAWINGS

Example embodiments will now be described further, by way of example, with reference to the accompanying drawings.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION

Directional terminology such as top, bottom, front, back, leading, trailing, under, over, and the like in the description and the claims is used for descriptive purposes with reference to the orientation of the drawings being described, and not necessarily for describing relative positions. Because components of example embodiments can be positioned in a number of different orientations, the directional terminology is used for purposes of illustration only, and is in no way intended to be limiting, unless otherwise indicated. It is, hence, to be understood that the terms so used are interchangeable under appropriate circumstances and that the example embodiments described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps, or components as referred to, but does not preclude the presence or addition of one or more other features, integers, steps or components, or groups thereof. Thus, the scope of the expression "a device comprising means A and B" should not be limited to devices including only components A and B.

Reference throughout this specification to "one embodiment" or "an embodiment" means that a particular feature, structure, or characteristic described in connection with the embodiment is included in at least one example embodiment. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the description of example embodiments, various features are sometimes grouped together in a single embodiment, figure, or description thereof for the purpose of streamlining the disclosure and aiding in the understanding of one or more of the various aspects of the disclosure. This method of disclosure, however, is not to be interpreted as reflecting an intention that the example embodiment requires more features than are expressly recited in each claim. Rather, as the following claims reflect, aspects of the claims lie in less than all features of a single foregoing disclosed embodiment. Thus, the claims following the detailed description are hereby expressly incorporated into this detailed description, with each claim standing on its own as a separate example embodiment.

Furthermore, while some embodiments described herein include some but not other features included in other embodiments, combinations of features of different embodiments are meant to be within the scope of the disclosure, and form different embodiments, as would be understood by those in the art.

In the description provided herein, numerous specific details are set forth. However, it is understood that example embodiments may be practiced without these specific details. In other instances, well-known methods, structures, and techniques have not been shown in detail in order not to obscure an understanding of this description.

Figure 1:
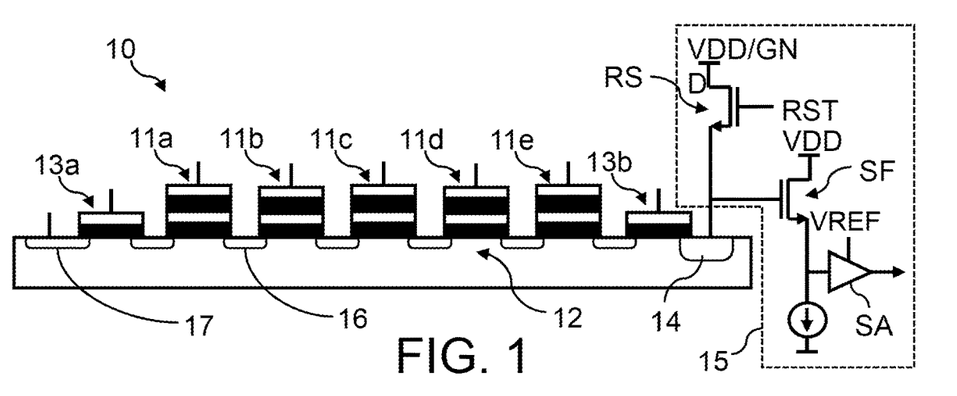
FIG. 1 is a simplified circuit diagram of an in-memory compute device, according to example embodiments.

FIG. 1 is a simplified circuit diagram of an in-memory compute device according to an example embodiment. The in-memory compute device 10 comprises a plurality of memory cells 11*a*-11*e* that are formed over a semiconductor channel structure 12. Owing to their series connection along the semiconductor channel structure, the memory cells 11*a*-11*e* form a NAND-type string of memory cells. In operation, the series connection between the individual memory cells may be established through a corresponding series of physical interior S/D-junctions 16, or through a series of induced, virtual interior S/D junction. Each memory cell 11*a* through 11*e* includes a programmable threshold transistor that is adapted to permanently store a programmable threshold voltage, which represents a weight input to the memory cell.

The memory cells of the in-memory compute device in accordance with example embodiments may be implemented in various ways, such as floating-gate transistor devices having a conductive charge accumulation/storage gate layer, charge trap transistor devices having a dielectric charge trap layer, or ferroelectric field effect transistor devices having a ferroelectric layer whose polarization state is programmable. Therefore, memory cells may be implemented as a multi-layer stack that is formed on or over the semiconductor channel structure 12. The memory cells comprise a control gate and a non-volatile storage layer that is capable of changing the threshold voltage for formation of a conductive channel in the semiconductor channel structure 12 underneath the memory cell. The threshold voltage associated with the non-volatile storage layer of the memory cell is programmable through the application of suitable control signals or control pulses to the control gate of the memory cell. In some example embodiments, the non-volatile storage layer may be a dielectric layer for the trapping and retention of trapped charges (e.g. in a charge trapping transistor-based memory cell) to modify the threshold voltage of the memory cell, a conductive metal or semiconductor layer (e.g. polysilicon layer) for the retention of tunneled charges (e.g. in a floating-gate transistor-based memory cell) to modify the threshold voltage of the memory cell, a ferroelectric layer with controllable electrical polarization state (e.g. in a ferroelectric transistor-based memory cell) to modify the threshold voltage of the memory cell, or others. In memory cells according to some example embodiments, e.g. in floating-gate transistor-based or charge trap transistor-based memory cells, a first insulating layer (e.g. blocking oxide layer) separates the control gate from the non-volatile storage layer, and a second insulating layer (e.g. tunnel oxide layer) separates the non-volatile storage layer from the semiconductor channel structure but may allow tunneling of charges from the channel structure into the non-volatile storage layer, and vice versa. A voltage signal on the control gate, e.g. between the control gate and the channel structure, and its duration may control the tunneling of charges into and out of the non-volatile storage layer, e.g. according to the Fowler-Nordheim tunnelling mechanism, or change/flip a polarization state of a ferroelectric layer. This allows the controlled programming and/or erasure of threshold voltages in respect of each memory cell of the string. Nonetheless, memory cells may be erased block-wise before re-programming them, e.g. whole memory cell strings or sets of memory cell strings. In general, higher voltage signals may be used for programming and/or erasing the threshold voltage information of a memory cell than for reading it out. Here, reading out the stored threshold voltage or weight input information of a memory cell is understood as obtaining a readout signal with respect to that memory cell (e.g. readout voltage, readout current, or readout charge signal) that allows quantifying the stored threshold voltage or weight input information and discriminating among different permitted threshold voltage levels/weight input levels. At least two distinct threshold voltages are programmable in each memory cell. Hence, each memory cell of the string of memory cells is either a single-level cell capable of storing a single bit or a multi-level cell capable of storing multiple bits of information in a non-volatile fashion.

The semiconductor channel structure may be formed in or on the surface of a planar substrate and the arrangement of memory cells that are formed over the channel structure is a planar one.

Alternatively, the semiconductor channel structure may be erected on the horizontal surface of a planar substrate and extend therefrom in a vertical direction. The memory cells are then formed along an exterior surface of the vertical channel, optionally surrounding a core of the vertical channel in a wrap-around gate design. Individual memory cells may be mapped by control gate planes intersecting with the vertical channel, whereas the tunnel oxide layer, charge trap layer and blocking oxide layer may be formed as continuous concentric layers surrounding the vertical channel core. Other vertical memory cell string architectures are feasible.

For example, pairs of memory cells being formed on two opposite external surfaces of a vertical channel core structure, wherein memory cells pairs are stacked vertically and the control gates of each pair of memory cells are operated in parallel and share a common control signal. Moreover, it is possible that the vertical channel, the tunnel oxide layer, the charge trap layer, and the blocking oxide layer fold back to cover two opposite exterior surfaces of a central vertical stack of mutually insulated control gates.

Although the memory cells of the present example embodiment are strung together along a straight line, i.e. forming a linear string, a spatial configuration of the string of memory cells is not limited to linear strings. For instance, longer string of memory cells can be obtained from shorter sub-strings of memory cells by connecting several sub-strings at their respective end portions. The resulting longer string of memory cells may have a U-shape or a meandering shape with intermediate connections, e.g. pipe connections between subsequent sub-string segments. In a memory array device including a plurality of non-planar columns (e.g. pillars) or planar columns of memory cells, the longer string of memory cells may be composed of several series-connected columns of memory cells.

The material of which the semiconductor channel structure is formed, may comprise silicon, for example, polycrystalline silicon (i.e. polysilicon). Nevertheless, high-purity monocrystalline silicon may be also used, as well as compound semiconductors such as indium-gallium-zinc-oxide (IGZO). The latter may be selected to allow the manufacture of in-memory compute devices according to example embodiments in which the memory cells are implemented as thin-film transistor devices.

The conductive channel in the semiconductor channel structure underneath the memory cells may be formed by inversion charges (inverted channel via inversion-mode transistors) or by accumulation charges, e.g., such as the bulk channels in junctionless nanowire all-around gate transistors or accumulation-mode transistors. Besides, the conductive channel may be a surface channel or a bulk channel. The mechanism behind the formation of the free charge carriers—inversion or accumulation—is not limiting as long as the semiconductor channel structure underneath the memory cells can be depleted, thus allowing modulation of the amount of induced inversion or accumulation charge in the semiconductor channel structure underneath the respective memory cells of the string.

Still in reference to FIG. 1, an exterior source junction or source-sided junction 17 of the in-memory compute device 10 is controllably connectible to one end of the string of memory cells 11a-11e via a string select switch 13a. Further, a sense node 14 of a readout circuit 15 of the in-memory compute device 10 is controllably connectible to the other end of the string of memory cells 11a-11e via charge transfer switch 13b. The sense node 14 may be a floating diffusion (FD) node, a parasitic capacitance, or an integrated charge storage capacitor. The readout circuit 15 is configured to buffer the charge packets that are transferred from the channel structure 12 underneath the string of memory cells onto the sense node 14. The buffered charge packets induce a voltage signal at the sense node if the sense node is in a floating state, i.e. disconnected from any external voltage supply, e.g. disconnected from VDD. This induced voltage signal is indicative of a charge sum. Upon application of a reset pulse "RST", a reset transistor "RS" of the readout circuit 15 toggles the sense node 14 from a floating state back into a well-defined voltage state, e.g. connection to VDD, thereby removing the buffered charge packets from the sense node and effectively resetting the voltage at the sense node to a reference voltage level, e.g. close to VDD.

The readout circuit 15 is further configured to convert the induced charge sum signal into an output voltage. In the present embodiment, this is achieved with a source-follower transistor "SF" whose control gate terminal is connected to the sense node 14 and thus is receiving the induced charge sum signal, e.g. the aggregate charge of all transferred inversion charge packets. The source-follower transistor "SF" has its drain terminal connected to a voltage supply, e.g. VDD, and its source terminal is connected to a constant current source. In operation, a voltage at the source terminal of the source-follower transistor follows the charge sum signal that is buffered at the sense node 14 and is converted into a digital output signal, e.g. a digital readout signal generated by the readout circuit 15, using a sense amplifier "SA" which compares the followed voltage signal to a reference voltage signal "VREF". The reference voltage signal "VREF" that is input the sense amplifier "SA" may be a ramped signal originating from a reference memory cell, i.e. a memory cell that is similar or identical to the memory cells 11a-11e of the string, but it not part of the string. Optionally, the readout circuit comprises sample-and-hold circuitry, which allows for the intermediate storage of multiple voltage samples obtained in respect of the sense node. Intermediately stored voltage samples may be combined in the analog domain, e.g. added or subtracted.

The string select switch 13a and the charge transfer switch 13b may be implemented as simple field effect transistors, distinct from the memory cells, as modified versions of the memory cells 11a-11e in the same string, e.g. by short-circuiting the control gate and the non-volatile storage layer, or as separately programmed versions of the memory cells 11a-11e in the same string, e.g. by invariably programming the constituent memory cells of the switches 13a, 13b to a fixed threshold voltage level $VT_{Fix}$. Both string select switch 13a and charge transfer switch 13b can be controlled independently of the memory cells 11a-11e. In a variant of the present embodiment, the source junction 17, sense node 14, string select switch 13a, and charge transfer switch 13b are connectible to the same end of the memory cell string. The string select switch 13a and/or the charge transfer switch 13b may include several separate, series-connected switches that act in unison. Moreover, dummy cells may be arranged between either one of the switches 13a, 13b and the actual memory cells of the string. This may allow performance degradation to be minimized through drain-induced barrier lowering. In example embodiments in which the in-memory compute device comprises a plurality of memory cell strings and memory cells are organized into an array, two or more strings of memory cells may share the same sense node and corresponding readout circuit.

Part of the readout circuit, e.g. the sense amplifier (SA) and the current source, may be arranged at a periphery of the array. The other part of the readout circuit, e.g. the reset transistor (RS) and the source follower transistor (SF), may be present at each string or shared between a group of strings, e.g. shared between two, three, four, or more strings. When many strings of memory cells are arranged into a 2D array or 3D array, the source electrodes of the source follower transistors (SF) are connected to respective bitlines of the array via a row select switch (not shown in FIG. 1). Each bitline of the array then is connected to the sense amplifier and the current source at the periphery. The gates of the row-select transistor are connected to row-select lines of the array that may run orthogonal to the bitlines.

The in-memory compute device may comprise control circuitry (not shown) that generates the control signals and control signal sequences that are applied to the individual memory cells of the string of memory cells and to the two control switches 13a, 13b, when the device is operative. Among the applicable control signal sequences are binary input signals to each memory cell of the string, which represent a digital data input or "activation" to be combined with the respective weight input that is stored in the memory cell. The control circuitry may further control, directly or indirectly, the voltage bias that is applied to source junction and/or the sense node. In some example embodiments, the control circuitry is configured to carry out the steps of methods of operating the in-memory compute device described below.

Figure 2:
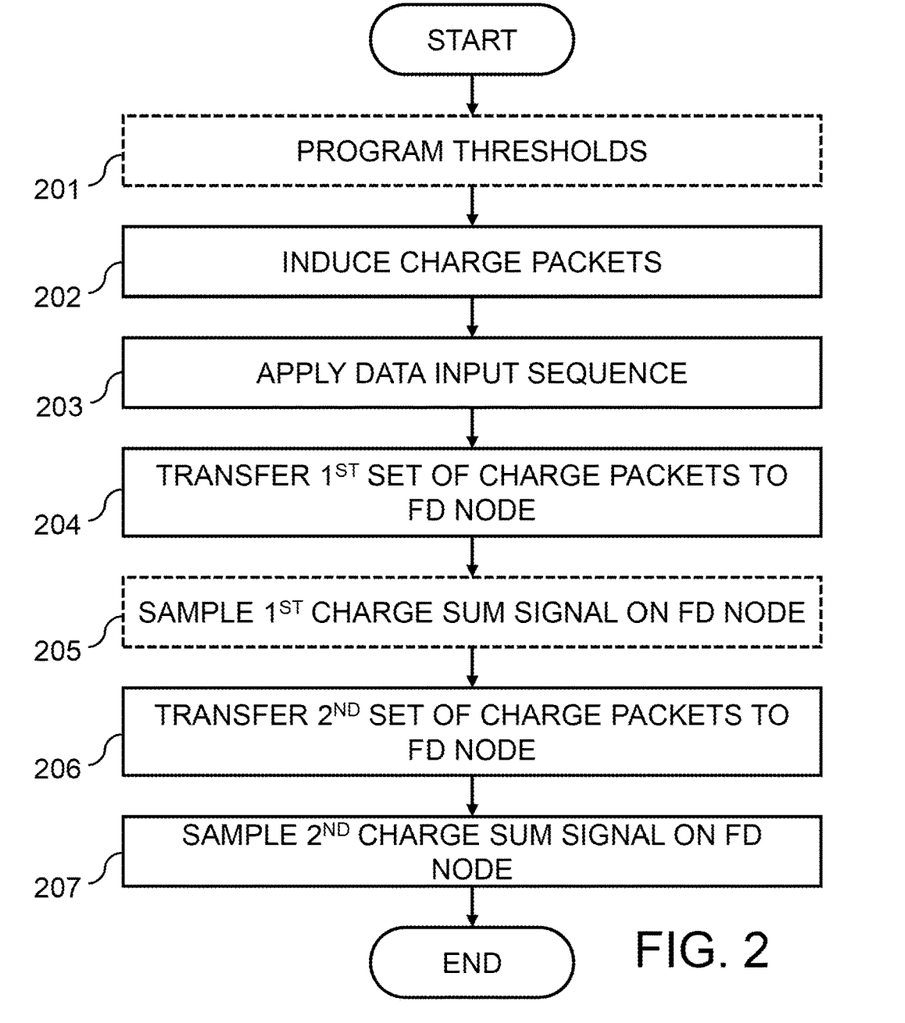
FIG. 2 is a flow diagram of a method of operating an in-memory compute device, according to example embodiments.

With reference to the flow diagram of FIG. 2, a method of operating the in-memory compute device is now described, which performs a multiply- and accumulate (MAC) operation on a set of digital data inputs, e.g. an "activation vector", and a corresponding set of weight inputs, e.g. a "weight vector" which may be part of a larger weight matrix. The output signal which is generated by the readout circuit of the in-memory compute device at the end of this method represents the outcome or result of the MAC-operation or dot-product between activation vector and weight vector.

Some example embodiments may comprise a step 201, wherein a set of weight inputs is written to the memory cells of the string, e.g. if updates to the stored weight inputs are required or a fresh set of weight input has been requested. This may occur during weight updating in a training method for artificial neural networks or if large weight matrices are multiplied with an activation vector. This step may be skipped if the previously stored weight inputs are used.

Step 201 involves programming of the individual memory cells of the string. Such programming methods may be used in the field of NAND flash memory devices. In an example embodiment, one programming method may include erasing all the memory cells of the string and then programming the threshold voltages of the respective memory cells of the string, one memory cell at the time. Erasure of the memory cells may include changing the threshold voltages of all memory cells of the string to the lowest permitted level, e.g. by briefly applying a strong positive voltage bias to the channel structure relative to the control gates of the memory cells in the string so that negative charges on retained on the non-volatile storage layer of all memory cells in the string are tunneling back into the channel structure. Writing of the individual threshold voltages to the different memory cells of the string may include biasing the channel structure at ground potential and briefly applying one or more programming voltage pulses to the control gate terminal of the memory cell whose threshold is to be written, while applying a pass mode voltage to all the other, unselected memory cells of the memory string. This injects negative charges from the channel structure, as a tunnel current, back into the non-volatile storage layer of the memory cells that is being programmed, thereby increasing its threshold voltage to the desired value. The amplitude of subsequently applied programming voltage pulse steps may be increased incrementally and is more positive than the pass mode voltage. In order to verify a successful programming of a target memory cell, the memory cell may be read out after each writing step, e.g. after each applied programming voltage pulse. In an array configuration of memory cells which comprises a plurality of different memory cell strings, unselected memory cell strings (strings not addressed for programming) that share a common word line with the memory cells to be programmed in a selected string may be inhibited from programming. Program inhibition of memory cells in unselected strings may be achieved by channel self-boosting, where the channel structure associated with the unselected memory cell strings is a floating state and disconnected from any external voltage supply so that capacitive coupling between word lines and channel structures raises the channel potential in respect of unselected memory cell strings and prevents programming by tunneling charges.

Next, charge packets are induced in the channel structure 12 underneath each memory cell 11a-11e in step 202 by application of a suitable pass mode voltage "VPM" to the control gates or control gate terminals of each memory cell of the string, i.e. a voltage level superior to the largest permitted value of the programmable threshold voltage. Application of the pass mode voltage signal "VPM" to the respective memory cells thus can ensure that all of the programmable threshold transistors are switched on, irrespective of the individually programmed threshold voltages, thus establishing a channel structure that is conductive through the string. Charge packets are induced along the channel and fill the potential wells in the conduction band of the channel semiconductor material.

The particular charge or size Q(i) of charge packets along the channel structure is determined by the overdrive voltage V_OV=VPM−VT(i) that is applied to the transistor device of the corresponding i-th memory cell along the string. Typically, one measures charge packet sizes that are directly proportional to the overdrive voltage: Q(i)=const*(VPM−VT(i)). Therefore, the pass mode signal can be varied in some example embodiments to adjust the size of the induced charge packets. With respect to memory cells based on inversion-mode programmable threshold transistors, the charge packets are inversion charges and may be formed near or at the channel surface. However, the charge packets may be accumulation charges memory cells in the interior (bulk) of the channel structure if memory cells are based on accumulation-mode, programmable threshold transistors.

In some embodiments, the permitted values for the programmable threshold voltages may be 0.5 V, 2.5 V, 3.5 V, and 4.0 V for quad-level memory cells. Using a pass mode voltage of 4.5 V, for example, leads to charge packets with size ratio 4:2:1:0.5 or, equivalently, 8:4:2:1. Hence, 4-bit wide weight inputs may be stored in each memory cell of the string and give rise to charge packets that follow a power of two scaling. Different size ratio between the charges induced by the permitted values of the programmable threshold voltage may be realized in other embodiments.

Figure 3:
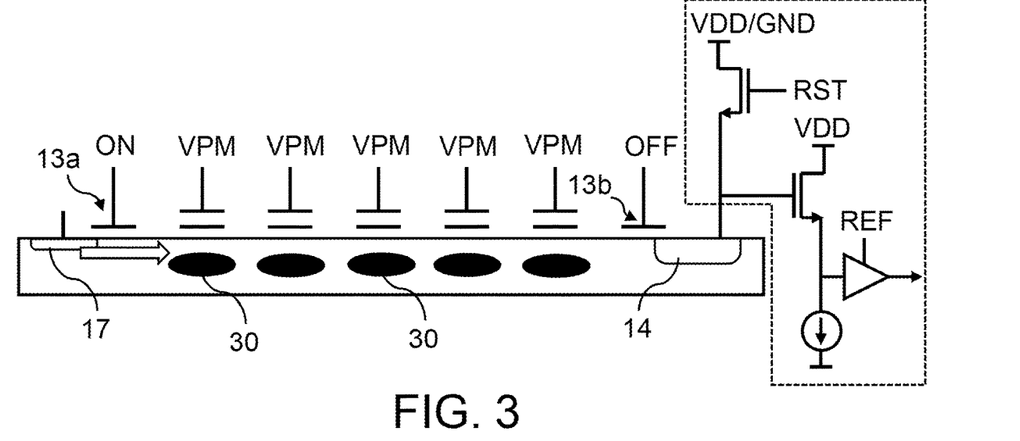
FIG. 3 illustrates the configuration of charge packets underneath each memory cell in the in-memory compute device, according to example embodiments.

FIG. 3 shows charge packets that are formed in the channel structure 30 underneath each memory cell at the end of step 202, which is an initialization step for the in-memory compute device. The source junction 17 is operatively connected to an external voltage source, e.g. GND, and acts as a reservoir of charge carriers that promotes the flow of charge carriers across the string select transistor 13a in the switched-on state ("ON") and into the channel structure. The voltage level provided by the external voltage source can be used to control the potential along the channel structure 12. Charge transfer switch 13b may either remain in its switched-off ("OFF") during step 202 or is toggled into its ON-state to also connect the sense node 14 to the channel structure 12. In the latter case, the potential at the sense node should be chosen substantially equal to the potential at the source junction 17. This can be achieved by switching on the reset transistor "RS" of the readout circuit 15 to couple the sense node to an external voltage source biased at low voltage, e.g. GND.

In some embodiments in which the sense node, e.g. a floating diffusion (FD) node, is identical to the source junction and the charge transfer switch is identical to the string select switch, the sense node and charge transfer switch are operated in the same way as the source junction and string select switch of the preceding embodiment (i.e. the charge transfer switch would receive a control signal toggling it into the "ON" state and the sense node is connected to an external voltage source, e.g. GND via the conducting reset transistor "RS").

In the following step 203, the data input signals in accordance with the digital data inputs are applied to the control gate terminals of the respective memory cells of the string. The two binary values of the digital data inputs are represented by two corresponding data input signal voltages, e.g. "V1" and "V0" to represent a digital "ON" and a digital "OFF" respectively. Non-limiting examples of the first and second data input signal voltages are V1 between 3 V and 5 V and V0 equal to 0 V. The first data input signal voltage "V1" is generally larger than the largest permitted value for the programmable threshold voltages and may be chosen equal to the pass mode voltage in some embodiments. In contrast thereto, the second data input signal voltage "V0" may be smaller than the smallest permitted value for the programmable threshold voltages. This choice of the first and second data input signal voltage verifies that the data input signals representing a digital "ON" cause the corresponding memory cell transistors to stay switched on, whereas the data input signals representing a digital "OFF" cause the corresponding memory cell transistors to be switched off. The previously induced charge packet underneath a memory cell whose transistor has been switched off is swept out of the semiconductor channel structure and collected on the sense node in step 204. The two steps 203 and 204 may be performed at the same time.

In some embodiments, zero-valued weight inputs can be obtained if the first data input signal voltage "V1" is chosen between the largest permitted value for the programmable threshold voltages and the second-largest permitted value for the programmable threshold voltages. In this case, the zero-valued weight inputs may be mapped to the largest permitted value for the programmable threshold voltages.

Moreover, the data input signals are applied sequentially according to each memory cell's position "i" in the string, i.e. form a data input sequence. For instance, the first position in the string is assigned to the memory cell in the string that is farthest from the sense node, the second position is assigned to the memory cell in the string that is adjacent to the memory cell that is farthest from the sense node, and so forth. For a string counting "M" memory cells, the M-th position is then assigned to the memory cell that is closest to the sense node. Application of the data input signals thus results in the transfer of charge packets from underneath all those memory cells that receive a digital "OFF" as digital data input (e.g. activation value) towards and onto the sense node, where they are buffered temporarily. In other words, the memory cells of the string of memory cells are logically divided into two groups: a first group of memory cells along the string for which the applied data input signal represents a digital "OFF" and a complementary, second group of memory cells along the string for which the applied data input signal does not represent a digital "OFF", e.g. represents a digital "ON". Induced charge packets in respect of memory cells of the first group are transferred towards and collected on the sense node.

Figure 4:
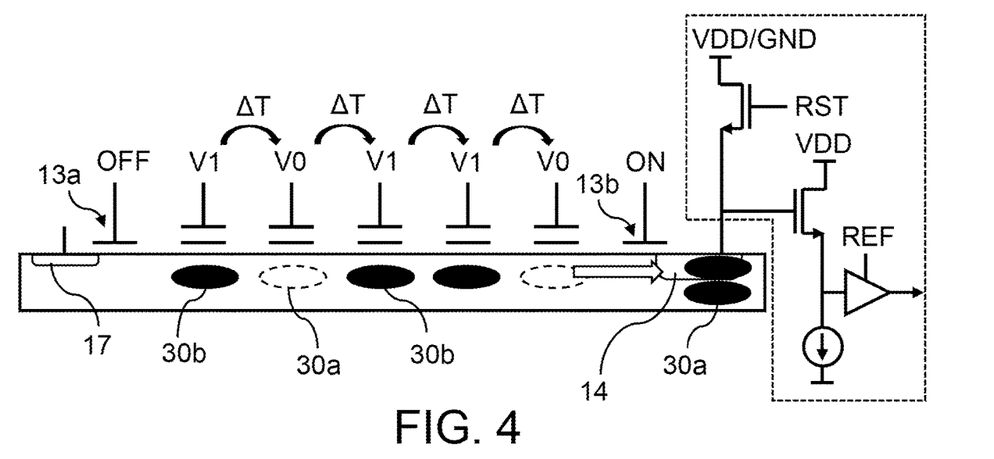
FIG. 4 illustrates another configuration of charge packets underneath each memory cell in the in-memory compute device, according to example embodiments.

FIG. 4 illustrates the collection of transferred charge packets 30a on the sense node 14 at the end of steps 203 and 204, jointly establishing a first phase of charge packet transfer from the semiconductor channel structure in the in-memory compute device. Each of the transferred charge packets 30a originally occupied a position in the channel structure underneath a memory cell of the first group that is now switched off. In the present example, the second memory cell 11b and the fifth memory cell 11e of the string belong to the first group whose transistor device has been switched off, e.g. by application of the second data input signal voltage "V0" to those memory cells. The three remaining memory cells 11a and 11c-d received the first data input signal voltage "V1", hence persist in their switched-on states, keeping the induced charge packets 30b in the channel structure underneath them. As indicated, data input signals are applied sequentially to the five memory cells 11a-11e of the string—the time between subsequently applied data input signals being ΔT. During transfer of the charge packets 30a, the source junction 17 is operatively disconnected from the channel structure, e.g. by switching off the string select switch 13a through application of a suitable "OFF" signal voltage (shown) or, alternatively, by increasing the voltage bias that is applied to the source junction 17 (not shown). In contrast thereto, the sense node 14 is operatively connected to the channel structure during the transfer of charge packets 30a, e.g. by asserting a suitable "ON" signal voltage on the control gate terminal of the charge transfer switch 13b.

A first sample of the charge sum signal at the sense node, e.g. floating diffusion (FD) node, may be obtained by the readout circuit in step 205. This first sample of the charge sum signal is indicative of the sum of partial products $\Sigma\_n$: $x(n)*w(n)$, where x are the binary-valued digital data inputs, w are the binary-valued or multi-level weight inputs and n is the index over all memory cells of the first group, i.e. memory cells receiving digital "OFF" as data input. The first sample may be digitized by the sense amplifier "SA" of the readout circuit and stored for later usage or may be discarded. For instance, products in a partial sum related to a MAC-operation for which the digital "OFF" state is associated with a numerical "0" do not contribute to the sum of products or dot-product between activation input and weight. They may thus be discarded. Alternatively, products in a partial sum related to a MAC-operation for which the digital "OFF" state is associated with a numerical "−1", e.g. representative of inhibitory synapse connections in an artificial neural network (ANN), do contribute to the sum of products or dot-product between activation input and weight. In this case, the first sample represents a partial sum of product terms associated with inhibitory synapse connections and may be stored as a digital value in an external memory unit or in an additional digital memory unit of the in-memory compute device. It may also be stored temporarily as an analog signal in the readout circuit, where it may be combined, e.g. added or subtracted, from future samples of the charge sum signal at the sense node.

Figure 5:
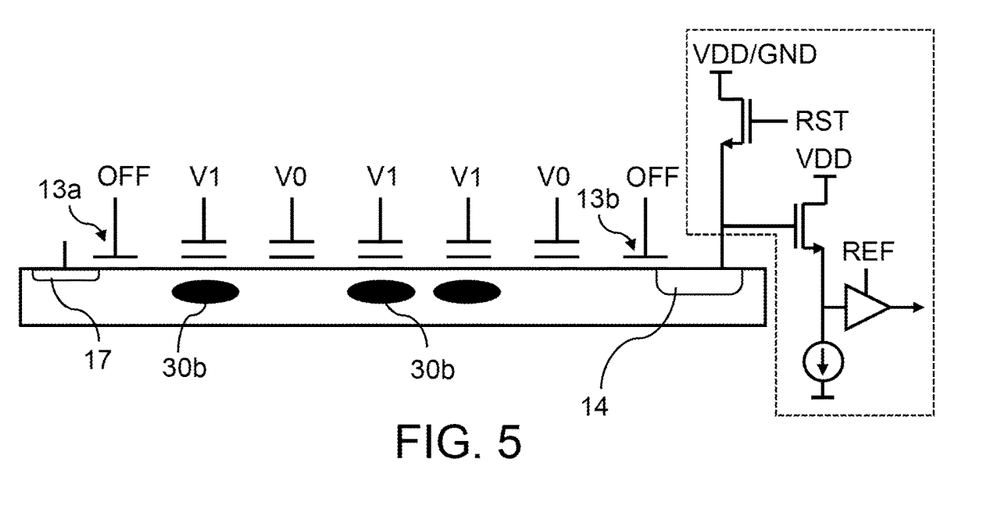
FIG. 5 illustrates another configuration of charge packets underneath each memory cell in the in-memory compute device, according to example embodiments.

During the sample acquisition step 205, the charge transfer switch 13b is turned off so that the sense node 14 is disconnected from the channel structure and enters a floating state. Having acquired the sample of the charge sum signal at the sensing node at this point, the voltage at the sense node is reset, e.g. by applying a reset pulse "RST" to the reset transistor "RS" of the readout circuit. As shown in Figure, this removes the buffered charge packets on the sense node.

In some example embodiments, correlated double sampling may be applied. In this case, the acquired first sample can be corrected, digitally by post-processing unit or analogously in the readout circuit, by a reference signal obtained by sampling the sense node potential immediately after resetting. In yet other example embodiments, the reference signal is used as a substitute for the first sample, e.g. if the charge sum signal represents a partial sum of zero contribution.

After the first sample acquisition step 205, the reset transistor "RS" is switched off again and the charge transfer switch 13b is toggled back into its "ON"-state, whereby the sense node 14 is re-connected to the channel structure. Then, a second phase of charge packet transfer towards the sense node, e.g. FD node, is started in step 206. Induced charge packets in respect of the complementary, second group of memory cells—the memory cells of the string that did not previously receive a digital "OFF" as data input—are now pushed out of the channel structure and collected on the sense node. If an induced charge packet is pushed into a depleted part of the channel structure from one side, it will flow through the channel towards the other side. In terms of applicable control signals, this can be achieved by applying a stop signal sequentially to the respective control gate terminals of the programmable threshold transistors of all the memory cells of the string. A voltage level associated with the stop signal is smaller than the smallest permitted value of the programmable threshold voltages, e.g. constitutes a cut-off voltage for all memory cells of the string. It may be chosen equal to the aforementioned second data input signal voltage "V0". As a result thereof, each memory cell of the string of memory cells is switched off at the end of step 206. The stop signals are applied sequentially according to each memory cell's position "i" in the string, i.e. form a stop signal sequence. As explained previously, the first position in the string may be assigned to the memory cell in the string that is farthest from the sense node, the second position may be assigned to the memory cell in the string that is adjacent to the memory cell that is farthest from the sense node, and so forth. The sequential application of data input signals and strop signals prevents charge packets from being moved in a direction that is opposite to the transport direction. It also ensures that charge packets are not left floating and cut off from the conductive part of the channel structure. Rather than having the charge transfer switch 13b switched on completely during the second phase of charge packet transfer, it is also sufficient to apply a voltage bias to its gate electrode such that charge packets arriving from the channel structure can be effectively pushed across the residual potential barrier.

Figure 6:
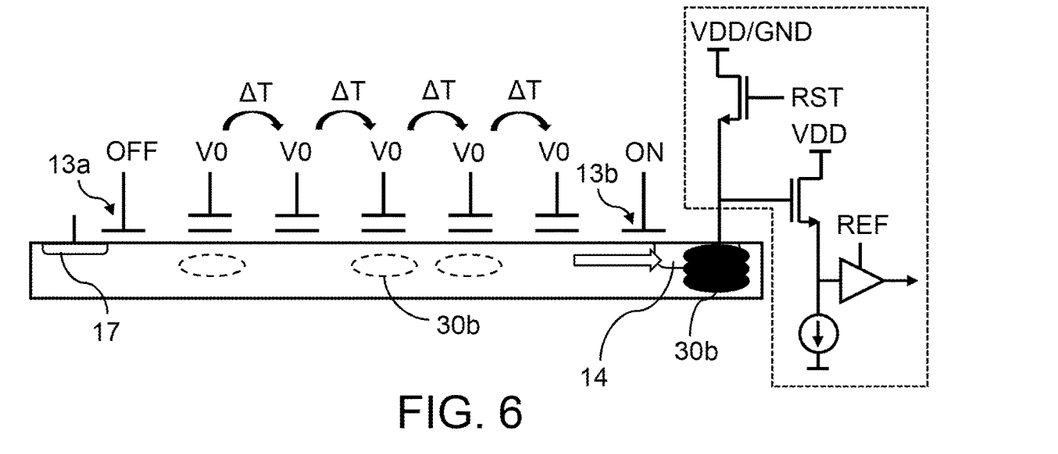
FIG. 6 illustrates another configuration of charge packets underneath each memory cell in the in-memory compute device, according to example embodiments.
Figure 7:
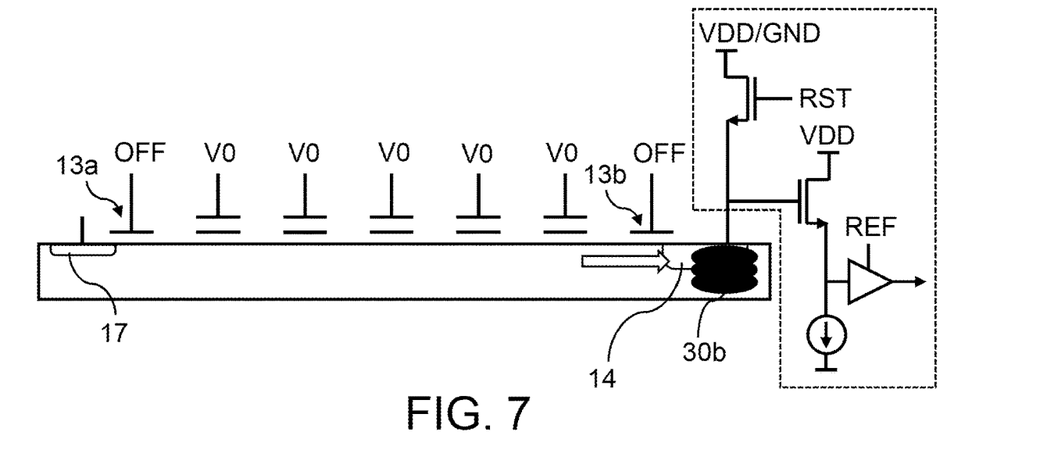
FIG. 7 illustrates another configuration of charge packets underneath each memory cell in the in-memory compute device, according to example embodiments.

FIG. 6 illustrates the transfer of a second set of induced charge packets 30b in the channel structure from their respective locations underneath memory cells of the second group, here memory cells 11a, 11c-d, towards the floating sense node 14, where they are buffered temporarily. Stop signals at voltage levels similar or equal to the second data input signal voltage "V1" are applied sequentially, in time intervals of ΔT, to all memory cells 11a-11e of the string.

Returning to FIG. 2, a last step 207 includes acquiring a second sample of the charge sum signal at the sense node. This second sample of the charge sum signal is induced by the buffered charge packets of the second group of memory cells, e.g. those memory cells to which a digital "ON" has been applied during step 203. Therefore, the second sample of the charge sum signal is indicative of the sum of partial products $\Sigma\_n$: $x(n)*w(n)$, where x are the binary-valued digital data inputs, w are the binary-valued or multi-level weight inputs, and n is the index over all memory cells of the second group, i.e. memory cells receiving digital "ON" as data input. The sample acquisition process in step 207 is performed similarly to the sample acquisition in step 205. As mentioned before, correlated double sampling (CDS) may be performed to correct the second sample of the charge sum signal after the second charge packet transfer phase. In some example embodiments in which the reference signal is used as a substitute for the first sample, the obtained first sample can be used to correct the second sample in the context of CDS. The second sample may be digitized by the sense amplifier "SA" of the readout circuit.

Some embodiments may include subtracting the first sample from the second sample obtained, either digitally by post-processing circuitry or analogously by using sense amplifiers with a differential input pair, or otherwise combining the first and second sample. This may include the use of corrected first and second samples, when performing CDS. A sample subtraction may be useful in embodiments in which the digital "OFF" state is associated with a numerical "−1", e.g. representative of inhibitory synapse connections in an ANN, whereas the digital "ON" state is associated with a numerical "+1", e.g. representative of excitatory synapse connections in the same ANN.

Repeating the method steps above while updating the weight inputs stored in the memory cells of the string at the beginning of each new iteration, e.g. writing successive weight vectors of a weight matrix to the memory cells of the string, is one example of how the preceding method can be extended to perform vector-matrix multiplications.

In some example embodiments, an in-memory device may also be used more generally to select and combine (e.g. sum) one or more components of data vectors stored in the memory cells of the string. This may be used, for example, to obtain a population count. The components of the data vector may be binary digits, ternary digits, etc. (i.e., each component may represent a single or multiple bits of information).

In a variant of the present embodiment, the charge packets underneath the first group of memory cells are transferred onto the source junction instead of the sense node in step 204. This may be done in cases in which no first sample is to be acquired or the reference voltage at the sense node is used as a substitute for the first sample. Induced charge packets can be pushed out of the channel structure and gathered on the source junction if the string select switch is switched on, the voltage bias on the source junction is decreased below the channel potential, and the source junction is left in a floating state. The charge transfer switch may be turned off. This variant may be used if a plurality of memory cell strings share a common readout circuit. In such a situation, multiple memory cell strings can be emptied of its first set of charge packets in parallel while the readout circuit can be actively sampling a charge sum signal with respect to another one of the plurality of strings.

Operating memory devices according to some embodiments may include setting the first data input signal voltage "V1" to a smaller value than the largest permitted value for the programmable threshold voltage but larger than the smallest permitted value for the programmable threshold voltage. A digital "ON" applied to a memory cell of the first group then may preserve the induced charge packets if the data input signal representing the digital "ON" is greater than the programmed threshold voltage for that memory cell. This way, a thresholding or rectification operation can be performed on the products of binary-valued data inputs (e.g. digital "ON" and "OFF") and multi-level weight inputs. Depending on whether increasing weight inputs are mapped to increasing or decreasing threshold values, the rectification operation discards the larger/largest ones or the smaller/smallest ones of all possible product outcomes respectively.

Figure 8:
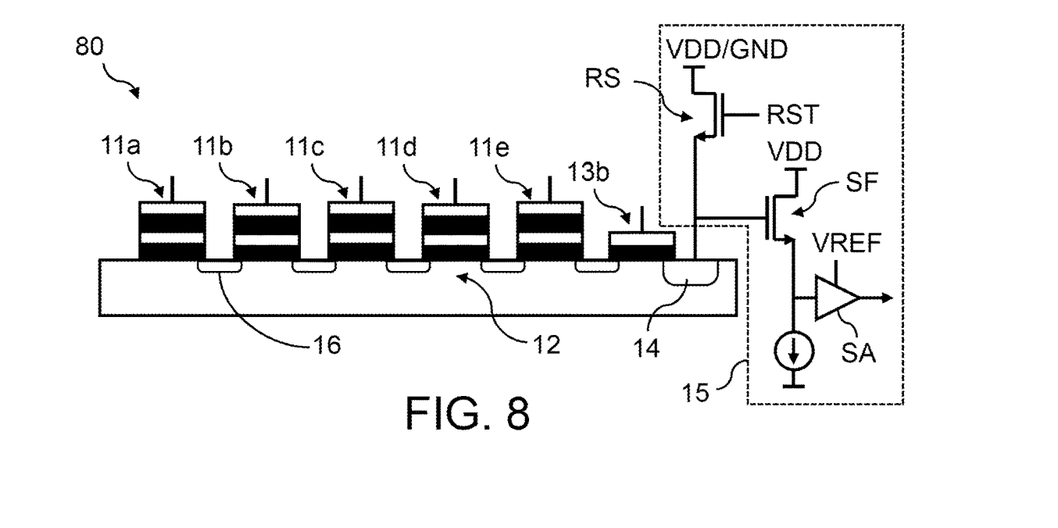
FIG. 8 is a simplified circuit diagram of the in-memory compute device, according to example embodiments.

FIG. 8 is a simplified circuit diagram of an in-memory compute device according to a second example embodiment. The in-memory compute device 80 according to this embodiment differs from the first embodiment in FIG. 1 in that the separate source junction 17 and string select switch 13a are absent. Consequently, the sense node 14, e.g. a floating diffusion node, also acts as a source of charge carriers during the initialization step 202 of FIG. 2, which induces the charge packets along the semiconductor channel structure. Since no separate source-sided junction, junction connectors, and source-sided signal line have to be formed, this embodiment may be straightforward to manufacture. However, providing a separate source junction and sense node may allow at least some steps of the method of operating the in-memory compute device to be pipelined. Charge packets can be induced in the channel structure, for example, while a sample of the charge sum signal at the sense node of the readout circuit is still being acquired.

Figure 9:
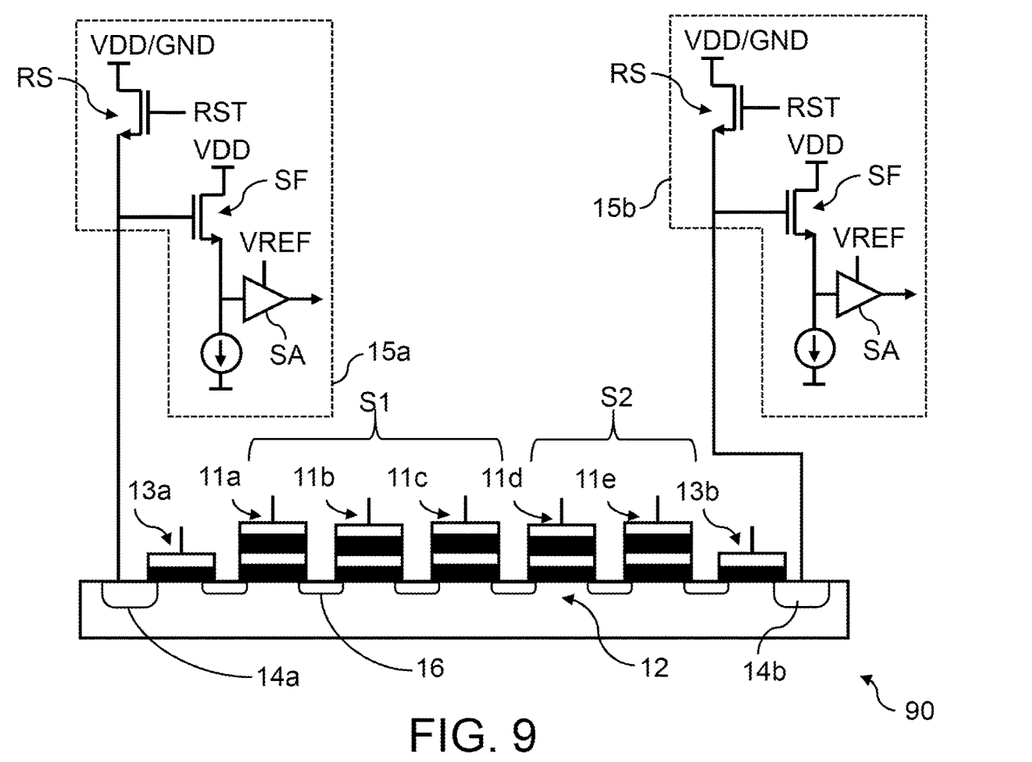
FIG. 9 is another simplified circuit diagram of the in-memory compute device, according to example embodiments.

FIG. 9 is a simplified circuit diagram of an in-memory compute device according to a third example embodiment. Therein, the in-memory compute device 90 comprises two readout circuits 15a, 15b with corresponding sense nodes 14a, 14b. Compared to the in-memory compute device of the first example embodiment, replacing the source junction by a further sense node 14a may allow induced charge packets to be transferred towards either side of the string of memory cells and collected on both sense nodes 14a, 14b simultaneously, when performing steps 204 and 206 of FIG. 2. The string of memory cells 11a-11e may be logically divided into two adjacent sub-strings "S1" and "S2" of approximately the same size so that each sub-string can be controlled by an independent sequence of data input signals. Data input signals with respect to the first sub-string "S1" are progressively applied from the center towards the sense node 14a, starting with innermost memory cell 11c of the subs-string "S1". At the same time, data input signals in respect of the second sub-string "S2" are progressively applied from the center towards the sense node 14b, starting with innermost memory cell 11d of the subs-string "S2". Despite the slight control overhead—the concurrent delivery of two independent data input signal sequences—this embodiment may benefit from an increase in operational speed and achieve higher throughputs, e.g. perform more MAC-cycles in a predetermined time interval.

Figure 10:
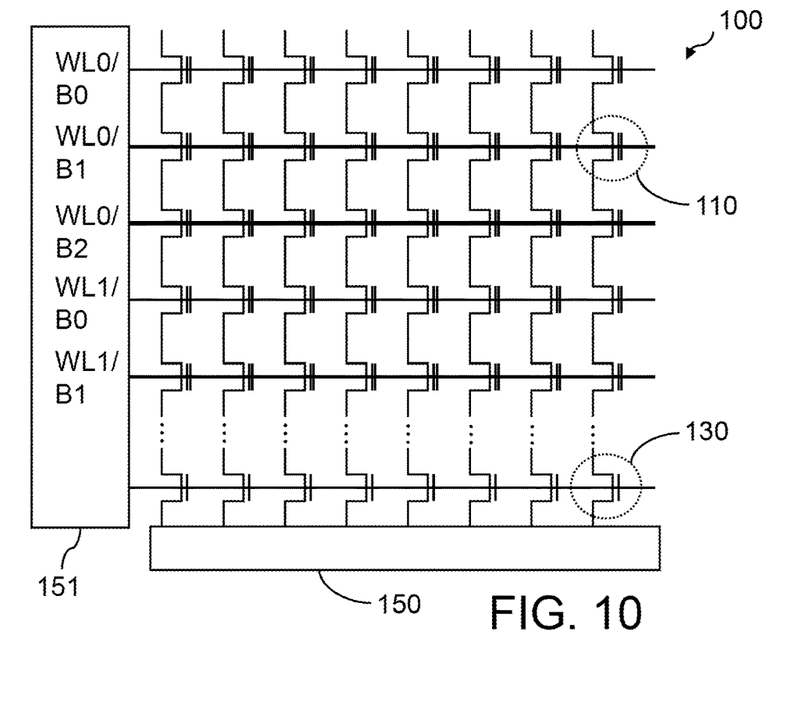
FIG. 10 illustrates an in-memory compute device having an array configuration of memory cells, according to example embodiments.

An in-memory compute device 100 with an arrayed configuration of memory cells is illustrated in FIG. 10. The memory cells 110 in the array are arranged into a plurality of rows and a plurality of columns, either in a planar/2D configuration or in a stacked 3D configuration. In the latter case, the array shown in FIG. 10 could represent a sub-array or a single plane that is obtained by slicing through the larger 3D device. Memory cells of a same column in the array are strung together to form a plurality of memory cell strings, e.g. as shown in respect of FIG. 8. Nonetheless, different columns of memory cells may be interconnected at their respective end portions to form longer strings. Moreover, memory cells of a same row are connected to a shared word line.

A readout circuitry 150 may be arranged at the periphery, e.g. the bottom edge, of the memory cell array. It may be formed on the horizontally extending substrate in a 3D stacked device architecture, from which the strings of memory cells extend upwards in a vertical direction. The readout circuitry 150 comprises the readout circuits that are associated with each string of memory cells. If groups of strings of memory cells are sharing the same readout circuit, the readout circuitry 150 comprises the readout circuits that are associated with each group of strings. Charge transfer switches 130 are provided at the end of each memory cell string to operatively connect the cell string to the sense node of the corresponding readout circuit.

A row control unit 151 may be arranged at the periphery of the memory cell array. It may be formed on the horizontally extending substrate in a 3D stacked device architecture. The row control unit 151 comprises row decoding and row driving circuitry, which is used to select word lines and apply control signals to the selected word lines. The control unit 151 plays the role of the control circuitry referred to in the first embodiment of FIG. 1. Word lines of the array may thus be selected sequentially and driven by data input signals or stop signals. Pass mode voltages may be applied to the word lines of the array in a sequential fashion or concurrently to all word lines of the array.

The particular embodiment illustrated in FIG. 10, accepts multi-level digital data inputs, e.g. data inputs that are multiple bits wide. Each multi-level data input is first translated into a collection of binary-valued data inputs, e.g. within the row control unit. In the present embodiment, a three-bit wide data input is translated into a set of three bits B0, B1, and B2, wherein B0 is the least significant bit of the multi-level data input and B2 is the most significant bit of the multi-level data input. Word lines of the array are also organized into sets, there being as many word lines in each word line set as there are translated binary-valued data inputs. For the in-memory compute device 100, three adjacent word lines of the array form one word line set. For instance, word lines WL0/B0, WL0/B1, and WL0/B2 form a first set of word lines of the array and are respectively transmitting the data input signals representing the bits B0, B1, and B2. The word lines that form one word line set do not have to be adjacent in the array but can be distributed differently. In order to obtain more contributions to the buffered charge sum signal from charge packets induced in each string's channel structure by the more significant bits B1 and B2, a gate length of the programmable memory cell transistors can be scaled according to the bit significance. This is indicated by the different thickness values of the word lines in each word line set. In memory cells based on floating-gate transistors, the gate length of the floating gate, or floating gate and control gate, can be scaled according to the bit significance. In charge trap transistor device-based memory cell, it is the gate length of the control gate that is scaled according to the bit significance.

Multiple strings of memory cells, corresponding to columns of the arrayed device 100, can share a same readout circuit. Charge packets from multiple strings can thus be accumulated on a shared sense node, which allows the computation of larger partial sums. In addition, strings can be operated in parallel to support full vector-matrix multiplication.

Figure 11:
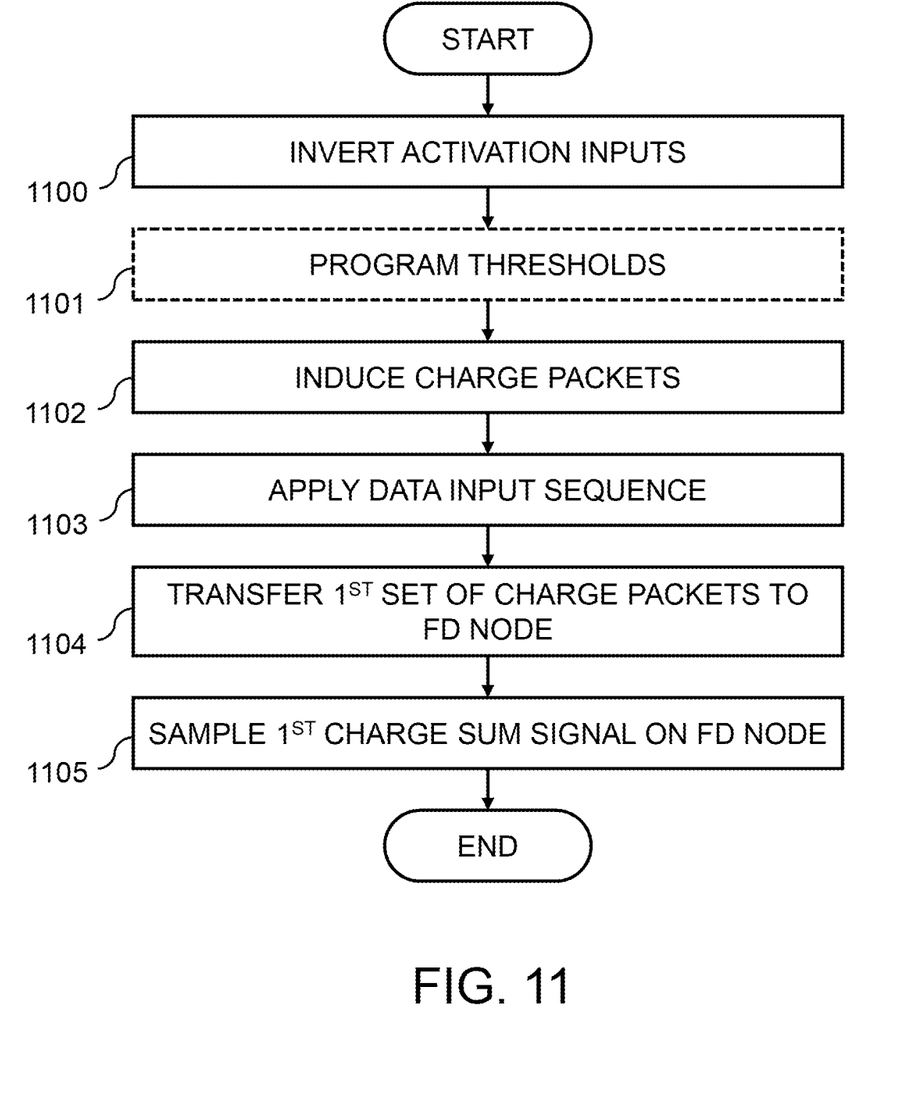
FIG. 11 is a flow diagram another method of operating an in-memory compute device, according to example embodiments.

A method of operating an in-memory compute device according to some example embodiments is illustrated in FIG. 11. Steps 1101 to 1105 correspond to method steps 201 to 205 of the embodiment in FIG. 2. However, an additional step 1100 of inverting the activation inputs/data inputs is included. This step may comprise carrying out a bitwise NOT-operation on the digital data inputs: each data input bit is replaced by its complement. Data input signal sequences to be applied during step 1103 are thus generated based on the inverted activation inputs. This means that memory cells of the first group are switched off during the first charge packet transfer phase in step 1104 when they receive data input signals representing a digital "ON" instead of a digital "OFF". In cases in which digital "OFF" inputs do not contribute to the partial sums of interest, e.g. have zero contribution, no second sample of the charge sum signal at the sense node needs to be acquired and steps 206 to 207 of FIG. 2 may be omitted in the flow diagram of FIG. 11.

Although the present disclosure has been illustrated and described with respect to one or more implementations, such illustration and description serve as examples and are to be considered illustrative and not restrictive. The foregoing description details certain example embodiments. It will be appreciated, however, that no matter how detailed the foregoing appears in text, equivalent alterations and modifications will occur to others skilled in the art upon the reading and understanding of this specification and the annexed drawings. In the claims, the word "comprising" does not exclude other elements or steps, and the indefinite article "a" or "an" does not exclude a plurality. Any reference signs in the claims should not be construed as limiting the scope.

What is claimed is:

1. An in-memory compute device for performing analog multiply-and-accumulate operations on a set of data inputs and a set of weight inputs, the in-memory compute device comprising:
   a string of serially connected memory cells formed over a semiconductor channel structure, wherein each memory cell comprises a programmable threshold transistor adapted for permanently storing a threshold voltage representing a respective weight of the set of weight inputs;
   a source junction controllably connectible to one end of the string of serially connected memory cells via a string select switch;
   a readout circuit including a sense node controllably connectible to one end of the string of serially connected memory cells via a charge transfer switch, wherein the readout circuit is configured to buffer transferred charge packets from the string of serially connected memory cells as a charge sum signal on the sense node and convert the charge sum signal into an output voltage; and
   control circuitry configured for:
      applying a pass mode signal to control gate terminals of the respective memory cells of the string to cause the memory cells of the string to be switched on, irrespective of the programmed threshold voltages;
      applying data input signals representative of the set of data inputs to the control gate terminals of the respective memory cells of the string, wherein applied data input signals representing binary zeroes cause memory cells of the string to be switched off;
      applying stop signals to the control gate terminals of the respective memory cells of the string to cause the remaining memory cells of the string to be switched off;
      enabling the string select switch to connect the source junction to the string of memory cells while applying the pass mode signal and the data input signals; and
      enabling the charge transfer switch to connect the sense node to the string of memory cells while applying the stop signals,
   wherein the data input signals and the stop signals are applied sequentially according to each memory cell's position along the string.

2. The in-memory compute device according to claim 1, wherein the readout circuit is further configured to sample the output voltage subsequent to applying the stop signals.

3. The in-memory compute device according to claim 2, wherein the control circuitry is further configured for disabling the charge transfer switch to disconnect the sense node from the string of memory cells while applying a reference voltage signal (VDD) to the sense node, and wherein the readout circuit is further configured to sample the output voltage subsequent to applying the reference potential to the sense node.

4. The in-memory compute device according to claim 1, wherein the sense node is identical to the source junction and the string select switch corresponds to the charge transfer switch.

5. The in-memory compute device according to claim 1, wherein the control circuitry is further configured for selecting a memory cell of the string to be programmed and applying a set of program signals to the control gate terminals of the memory cells of the string to assign a weight input to the selected memory cell, and wherein a program signal voltage with respect to the selected memory cell is larger than the program signal voltages with respect to the remaining memory cells of the string.

6. The in-memory compute device according to claim 1, wherein the string select switch or the charge transfer switch comprises one or more transfer gates.

7. The in-memory compute device according to claim 1, wherein the semiconductor channel structure comprises polysilicon, silicon, or a compound semiconductor material.

8. The in-memory compute device according to claim 1, wherein the programmable threshold transistors of the memory cells are provided as floating-gate transistors, dielectric charge trapping transistors, or ferroelectric field-effect transistors.

9. The in-memory compute device according to claim 1, wherein the stop signals are applied sequentially, starting with the memory cell that is farthest from the sense node.

10. The in-memory compute device according to claim 1, wherein the source junction is replaced with an additional sense node.

11. The in-memory compute device according to claim 1, further comprising:
a plurality of word lines arranged in rows;
a plurality of strings of serially connected memory cells formed over a corresponding plurality of semiconductor channel structures and arranged in columns, wherein the memory cells of the plurality of strings are disposed at cross-points of the columns and the rows of word lines; and
a source junction associated with each string of the plurality of strings and controllably connectible to an end of the string via a string select switch,
wherein the control circuitry comprises word line drivers connected to the plurality of word lines for supplying the pass mode signals,
wherein the data input signals and the stop signals to the control gate terminals of memory cells are associated with a same word line, and
wherein one or more sense nodes of the readout circuit are controllably connectible to one end of each string of memory cells via a corresponding charge transfer switch.

12. The in-memory compute device according to claim 11, wherein the strings of serially connected memory cells are oriented in a vertical direction with respect to a major horizontal surface of a substrate of the in-memory compute device to form a 3D structure.

13. The in-memory compute device according to claim 11, wherein the plurality of word lines are organized into word line sets, where the word line drivers are configured to drive the word lines of each word line set according to a multi-level data input, and wherein the control gate terminals of memory cells connected to different word lines of each word line set have different associated gate widths.

14. A method of performing analog multiply-and-accumulate operations in a memory device comprising at least one string of serially connected memory cells formed over a semiconductor channel structure, wherein each memory cell comprises a programmable threshold transistor adapted for permanently storing a threshold voltage indicative of a weight input to the memory cell, the method comprising:
inducing a charge packet underneath each memory cell in the semiconductor channel structure by switching on the programmable threshold transistors of the memory cells of the string, wherein a junction is operatively connected to one end of the string supplying the charge for inducing the charge packets;
transferring the charge packets induced by a first group of memory cells of the string to the junction by switching off the corresponding programmable threshold transistors on the string;
transferring the charge packets induced by a second group of memory cells of the string, complementary to the first group of memory cells of the string, onto a sense node operatively connected to one end of the string by switching off the remaining programmable threshold transistors on the string; and
buffering the transferred charge packets from the string of memory cells on the sense node to generate a charge sum signal and converting the buffered charge signal into an output voltage,
wherein transferring the charge packets to the at least one junction and transferring the charge packets onto the sense node each comprises transferring the charge packets sequentially according to each memory cell's position along the string.

15. The method according to claim 14, wherein the junction and the sense node are identical.

16. The method according to claim 14, further comprising programming the threshold voltages of the programmable threshold transistors on the string according to a set of weight inputs to the memory cells of the string, wherein the weight inputs are multi-leveled.

17. The method according to claim 14, further comprising selecting a memory cell of the string to be programmed and applying a set of program signals to the control gate terminals of the memory cells of the string to assign a weight input to the selected memory cell, wherein a program signal voltage with respect to the selected memory cell is larger than program signal voltages with respect to the remaining memory cells of the string.

18. The method according to claim 14, wherein the memory cells of the first group are switched off during the first charge packet transfer phase.

19. The method according to claim 14, wherein the junction is replaced by an additional sense node, and is connected to both ends of the string supplying the charge for inducing the charge packets.

20. The method according to claim 14, further comprising performing a rectification operation on the at least one weight inputs by inducing the charge packet underneath the first memory cell in the string of serially connected memory cells if the first weight input is smaller than the largest permitted value for the threshold voltage but larger than the smallest permitted value for the threshold voltage.

* * * * *